(12) United States Patent
Wang et al.

(10) Patent No.: US 11,885,362 B2
(45) Date of Patent: Jan. 30, 2024

(54) QUICK-RELEASE CONNECTION DEVICE

(71) Applicant: Shenzhen Asia Pacific Aviation Technology Co., Ltd., Shenzhen (CN)

(72) Inventors: Naiwen Wang, Shenzhen (CN); Jianwen Li, Shenzhen (CN)

(73) Assignee: Shenzhen Asia Pacific Aviation Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/348,500

(22) Filed: Jul. 7, 2023

(65) Prior Publication Data

US 2023/0358264 A1 Nov. 9, 2023

(30) Foreign Application Priority Data

Jul. 7, 2022 (CN) .......................... 202210803232.5

(51) Int. Cl.
*F16B 21/12* (2006.01)
*F16B 2/18* (2006.01)

(52) U.S. Cl.
CPC ............... *F16B 21/12* (2013.01); *F16B 2/18* (2013.01); *Y10T 403/32893* (2015.01)

(58) Field of Classification Search
CPC ... B60D 1/02; B60D 1/025; F16B 2/18; F16B 2/185; F16B 13/04; F16B 13/06; F16B 13/063; F16B 13/065; F16B 13/0808; F16B 13/0858; F16B 21/12; F16B 21/125; F16B 21/14; F16C 11/045; Y10T 403/32893; Y10T 403/32901; Y10T 403/32918; Y10T 403/595

USPC ......... 403/154, 155, 157, 322.4; 411/32, 33, 411/340, 345
See application file for complete search history.

(56) References Cited

U.S. PATENT DOCUMENTS

| | | | | |
|---|---|---|---|---|
| 2,077,825 A * | 4/1937 | Davidson | ................. | B60D 1/02 278/96 |
| 2,180,558 A * | 11/1939 | Stastny | .................... | B60D 1/02 278/96 |
| 2,224,522 A * | 12/1940 | Peterson | .................. | B60D 1/02 280/515 |
| 2,367,874 A * | 1/1945 | Kelley | ..................... | B60D 1/02 411/342 |
| 2,436,210 A * | 2/1948 | Fuhrer | ..................... | B62C 5/02 280/515 |

(Continued)

FOREIGN PATENT DOCUMENTS

| | | |
|---|---|---|
| CN | 105020226 A | 11/2015 |
| CN | 107939799 A | 4/2018 |

(Continued)

*Primary Examiner* — Josh Skroupa

(57) ABSTRACT

A quick-release connection device includes a main load-bearing structural rod, a safety pin, a cam handle, a spring piece and a clamping piece. A free end of the structural rod is provided with a pin hole for insertion of the pin. The cam handle is connected to an end opposite to the free end. One end of the spring piece is connected to the cam handle, and the other end is provided with an insertion hole such that it can be sleeved on the free end, and limited by the pin to form locking connection with the structural rod. One end of the clamping piece is connected to the cam handle or spring piece, and the other end is provided with an opening such that it can be sleeved on the free end, and can be limited by the spring piece to form locking connection with the structural rod.

11 Claims, 4 Drawing Sheets

(56) References Cited

U.S. PATENT DOCUMENTS

| | | | | | |
|---|---|---|---|---|---|
| 2,547,326 | A | * | 4/1951 | Kellogg | B60D 1/025 |
| | | | | | 24/DIG. 35 |
| 3,011,801 | A | * | 12/1961 | Neumann | B60D 1/02 |
| | | | | | 411/347 |
| 4,488,842 | A | * | 12/1984 | Deutsch | F16B 2/185 |
| | | | | | 411/33 |
| 4,526,396 | A | * | 7/1985 | Mayer | B60D 1/02 |
| | | | | | 280/515 |

FOREIGN PATENT DOCUMENTS

| | | | |
|---|---|---|---|
| CN | 111577730 | A | 8/2020 |
| CN | 111594521 | A | 8/2020 |
| CN | 211259310 | U | 8/2020 |
| CN | 211543914 | U | 9/2020 |

\* cited by examiner

QUICK-RELEASE CONNECTION DEVICE

CROSS-REFERENCE TO RELATED APPLICATIONS

This application claims the benefit of priority from Chinese Patent Application No. 202210803232.5, filed on Jul. 7, 2022. The content of the aforementioned application, including any intervening amendments thereto, is incorporated herein by reference in its entirety.

TECHNICAL FIELD

This application relates to connection structures, in particular to a quick-release connection device.

BACKGROUND

With the rapid development of aerospace industry, higher and higher requirements have been proposed for the strength, stiffness and service life of related products. As one of the three major systems of a helicopter, the rotor system plays a role in generating power to drive lifting and forward flight of the helicopter. The force generated by the rotor system is transmitted to the fuselage through the connection between the joint and the propeller hub, thus realizing various maneuvers of the helicopter. Therefore, the joint connectors of the rotor system need to withstand various alternating loads in vibrating environments, and extremely strict requirements are proposed for their strength, impact toughness, and fatigue strength. Moreover, their service life and maintainability should also be taken into consideration.

The joint connection members of the rotor system generally use forged bolts. In this case, it is required to consider the protection of the threads during disassembly and assembly, and once the threads are damaged, the connection member will be prone to failure. For the helicopters with requirements of folding on board and fast air transport, the rotors are inevitably needed to be folded, making it difficult for the joint bolts to meet the requirement of multiple disassembly and assembly operations. Moreover, the inconvenient disassembly and assembly process will easily lead to damage to the thread portion, thus affecting the connection reliability and safety. It is necessary to additionally adopt some measures to protect the threads when machining forged bolts (for example, in the shot peening process), resulting in complex process and long production cycle

SUMMARY

In view of the above problems in the prior art, this application provides a quick-release connection device that can be easily and repeatedly mounted and dismounted.

Technical solutions of this application are described as follows. This disclosure provides a quick-release connection device, including:
a main load-bearing structural rod;
a safety pin;
a cam handle;
a spring piece; and
a clamping piece;
wherein the main load-bearing structural rod assembly has an elongated rod shape; and a free end of the main load-bearing structural rod assembly is provided with a pin hole;
the safety pin is insertable into the pin hole;

the cam handle is rotatably connected to an end of the main load-bearing structural rod assembly opposite to the free end;

a first end of the spring piece is fixedly connected with the cam handle, and a second end of the spring piece is provided with an insertion hole, such that the spring piece is configured to be sleeved on the free end of the main load-bearing structural rod assembly, and to be limited by the safety pin to form a locking connection with the main load-bearing structural rod assembly; and a first end of the clamping piece is fixedly connected with the cam handle or the spring piece, and a second end of the clamping piece is provided with an opening communicated with outside such that the clamping piece is configured to be sleeved on the free end of the main load-bearing structural rod assembly, and to be limited by the spring piece to form a locking connection with the main load-bearing structural rod assembly.

In some embodiments, an end portion of the clamping piece is configured to extend along a length direction of the clamping piece to form the opening.

In some embodiments, the first end of the spring piece and the first end of the clamping piece are together fixedly connected with the cam handle; and the second end of the spring piece is configured to be separably attached to the second end of the clamping piece.

In some embodiments, the insertion hole is aligned with the opening; and the second end of the spring piece is configured to extend outside the second end of the clamping piece.

In some embodiments, a surface of a side the clamping piece away from the spring piece is provided with a stopping member, which protrudes from the surface of the side of the clamping piece away from the spring piece.

In some embodiments, the stopping member is spaced from the opening.

In some embodiments, the clamping piece has a rigid structure.

In some embodiments, the main load-bearing structural rod assembly comprises a core rod; the core rod comprises a connection portion, a shaft portion and a boss portion; the connection portion and the boss portion are respectively located at two opposite ends of the shaft portion; the connection portion is provided with a pivot hole to be rotatably connected with the cam handle; a limiting step is formed between the connection portion and the shaft portion; and the boss portion is provided with the pin hole.

In some embodiments, the connection portion is sleevedly provided with a Belleville spring, which is located between the cam handle and the shaft portion.

In some embodiments, the core rod is provided with a gasket; and the gasket is located between the Belleville spring and the cam handle.

In some embodiments, the connection portion is provided with an auxiliary hole, which is located on a side of the cam handle away from the limiting step.

Compared to the prior art, this application has the following beneficial effects.

The quick-release connection device of this application includes a cam handle, a main load-bearing structural rod, a spring piece, a clamping piece and a safety pin. The cam handle is rotatably connected to one end of the main load-bearing structural rod and can be rotated relative to the main load-bearing structural rod. First ends of the spring piece and the clamping piece are together fixedly connected with the cam handle, and second ends thereof can be sleeved on the free end of the main load-bearing structural rod, and the locking is achieved by inserting the safety pin into the free end of the main load-bearing structural rod. In use, it is just required to rotate the cam handle to achieve quick-release and quick-mount, simplifying the operation. The quick-release connection device provided herein is a thread-free structure, such that it can be mounted and dismounted repeatedly, and has a long service life. The combination of the spring piece and the clamping piece ensures the locking reliability and the structure rigidity. The quick-release connection device of this application has simple connection and reasonable transition between individual components and easy replacement, and can be machined and assembled using common devices or tools, suitable for the industrial manufacturing. The quick-release connection device of this application features simple structure, practical function, and convenient use, and has strong practicability, exhibiting a promising application prospect.

Figure 1:
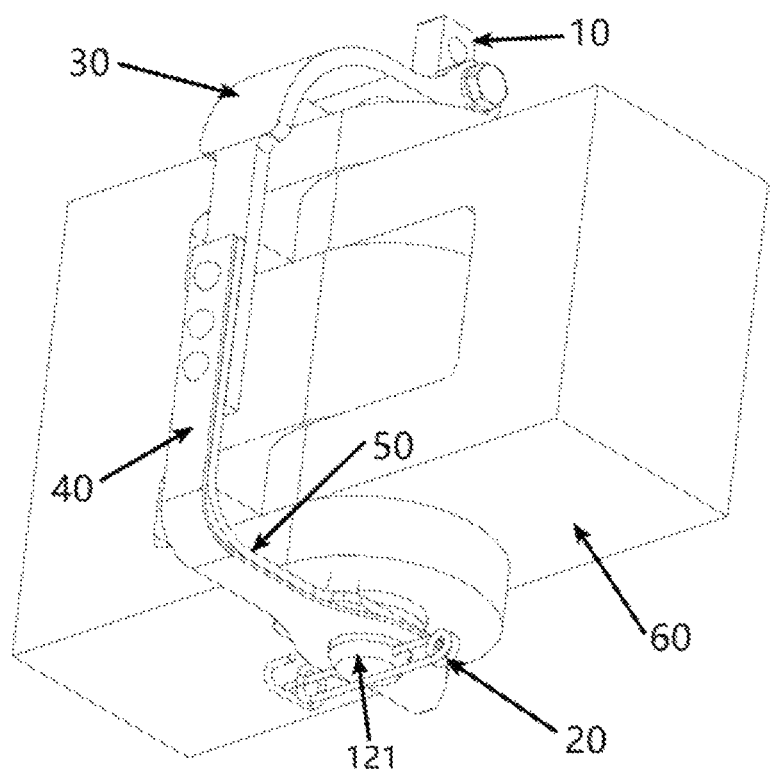
FIG. 1 is a schematic diagram of a quick-release connection device according to an embodiment of the present disclosure when using.

In the drawings: 10-a main load-bearing structural rod assembly; 11-pin hole; 12-core rod; 121-connection portion; 1211-auxiliary hole; 122-shaft portion; 1221-unloading groove; 123-boss portion; 1231-clamping groove 1231; 124-limiting step; 20-safety pin; 30-cam handle; 31-cam portion; 32-connection portion; 40-spring piece; 41-insertion hole; 50-clamping piece; 51-opening; 52-stopping member; 60-to-be-connected member; 70-pivot; 80-Belleville spring; and 90-gasket.

DETAILED DESCRIPTION OF EMBODIMENTS

The disclosure will be described in detail below with reference to the drawings and embodiments, but these embodiments are not intended to limit the disclosure.

As shown in FIGS. 1 to 4, the quick-release connection device of the present application includes a main load-bearing structural rod assembly 10, a safety pin 20, a cam handle 30, a spring piece 40 and a clamping piece 50. The main load-bearing structural rod 10 is used for load bearing, and can be inserted into the mounting hole of a to-be-connected member 60. The cam handle 30 is used for quick-release and quick-mount. The spring piece 40 and the clamping piece 50 are connected between the main load-bearing structural rod 10 and the cam handle 30 to realize the locking connection.

The safety pin 20 is used for preventing the spring piece 40 and the clamping piece 50 from disengaging from the main load-bearing structural rod 10, which makes the connection more reliable. The quick-release connection device of this application has a thread-free structure, and is suitable for quick-release and quick-mount. Moreover, the combination of the spring piece 40 and the clamping piece 50 not only simplifies the connection, but also improves the structural rigidity and plays a role of axial limit.

As shown in FIGS. 1-4, the main load-bearing structural rod assembly 10 has an elongated rod shape, and its length can be set as desired. The main load-bearing structural rod assembly 10 can pass through the mounting hole of the to-be-connected member 60 for connection. A pin hole 11 is provided on the free end of the main load-bearing structural rod assembly 10, where the safety pin 20 is insertable. An end of the main load-bearing structural rod assembly 10 opposite to the free end constitutes a rotary connection with the cam handle 30. Specifically, a first pivot hole is provided on that end of the main load-bearing structural rod assembly 10, and a pivot 70 is provided in the first pivot hole to form the rotational connection with the cam handle 30.

As shown in FIGS. 1-4, a first end of the cam handle 30 is rotatably connected with the main load-bearing structural rod assembly 10, and a second end is fixedly connected to the spring piece 40 and the clamping piece 50. The cam handle 30 includes a cam portion 31 and a connection portion 32. The cam portion 31 is eccentrically provided with a second pivot hole which is aligned and connected with the first pivot hole via the pivot 70, so as to form the rotatable connection with the main load-bearing structural rod assembly 10. In this case, the cam handle 30 can rotate around the pivot 70 to enable the quick-release and quick-mount. The connection portion 32 of the cam handle 30, which is formed by the outward extension of the outer wall of the cam portion 31, is configured to be fixedly connected with the spring piece 40 and the clamping piece 50. In this embodiment, the connection portion 32 is curved in a long-plate shape or a long-sheet shape.

As illustrated in FIGS. 1-4, one end of the spring piece 40 is fastened to the cam handle 30, and the other end extends to form a free end. The free end of the spring piece 40 has an insertion hole 41, which is a through hole and can be adjusted in shape as needed, such as a hexagonal hole or a round hole. The size of the insertion hole 41 is larger than that of the free end of the main load-bearing structural rod assembly 10, such that it can be sleeved on the free end of the main load-bearing structural rod assembly 10. To facilitate pushing the spring piece 40, the free end of the spring piece 40 is designed in an outwardly-tilted shape, such that a space is reserved between the free end of the spring piece 40 and the surface of the to-be-connected member 60 to allow the finger to easily push the spring piece 40. In this embodiment, the spring piece 40 is a thin and elongated sheet, such that it has a certain elasticity and can be pushed. The shape of the spring piece 40 can be set as needed. In this embodiment, the spring piece 40 is L-shaped, and can form a U-shaped-like structure when connected with the cam handle 30, thereby forming a closed square or square-like structure when connected with the main load-bearing structural rod assembly 10.

As presented in FIGS. 1-4, one end of the clamping piece 50 is fixedly connected to the cam handle 30, and the other end extends to form a free end. The free end of the clamping piece 50 is provided with an opening 51, which is formed by extension of the free end of the clamping piece 50 in the length direction thereof, and thus is communicated with the external. The shape of the opening 51 can be set as needed, such as U-shaped and semicircular. The size of the opening 51 is set such that the free end of the clamping piece 50 can be sleeved on the free end of the main load-bearing structural rod assembly 10. In this embodiment, the clamping piece 50 is in a long-sheet shape with a thickness greater than the thickness of the spring piece 40, and with a certain rigidity for axial limit. The shape of the clamping piece 50 can be set as needed. In this embodiment, the clamping piece 50 is L-shaped, and can form a U-shaped-like structure when connected with the cam handle 30, and therefore can form a closed square-shaped or square-shaped-like structure when connected with the main load-bearing structural rod assembly 10.

As displayed in FIGS. 1-4, in this embodiment, one end of the spring piece 40 and one end of the clamping piece 50 are jointly fixedly connected with the connection portion 32 of the cam handle 30. Specifically, they can be riveted together. The spring piece 40 is similar to the clamping piece 50 in overall shape so as to fit each other, and they can be separated when the spring piece 40 is pushed. The insertion hole 41 is aligned with the opening 51 when the spring piece 40 is attached to the clamping piece 50, and the free end of the spring piece 40 protrudes outside the free end of the clamping piece 50, that is, the length of the spring piece 40 is greater than that of the clamping piece 50. The spring piece 40 and the clamping piece 50 can be integrally sleeved on the free end of the main load-bearing structural rod assembly 10, where the spring piece 40 is located outside and the clamping piece 50 is located inside, such that the safety pin 20 can prevent the spring piece 40 from falling in the locking state, and the spring piece 40 can prevent the clamping piece 50 from falling.

Figure 2:
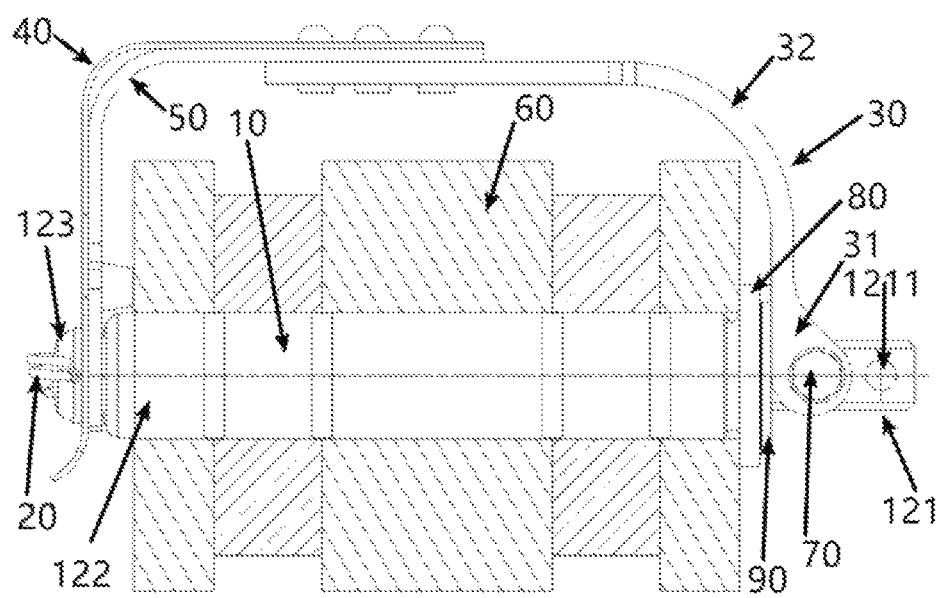
FIG. 2 is a cross-sectional view of the quick-release connection device according to an embodiment of the present disclosure when using.

As shown in FIGS. 1 and 2, in use, the main load-bearing structural rod assembly 10 can be inserted in the mounting hole of the to-be-connected member 60, and the cam handle 30 is rotated to sleeve the free ends of the spring piece 40 and the clamping piece 50 on the free end of the main load-bearing structural rod assembly 10. Then, the safety pin 20 is inserted in the pin hole 11 of the main load-bearing structural rod assembly 10, so as to allow the spring piece 40 and the clamping piece 50 to form a locking connection with the main load-bearing structural rod assembly 10. In this case, the whole quick-release connection device is in a closed square or square-shaped-like structure to achieve locking and quick-mount.

In the case of releasing or detaching the connection device, it is required to remove the safety pin 20 and outwardly bend the free end of the spring piece 40 so that the insertion hole 41 of the spring piece 40 is separated from the free end of the main load-bearing structural rod assembly 10. Then, the cam handle 30 can be rotated to drive the clamping piece 50 to be separated from the free end of the main load-bearing structural rod assembly 10. After that, the main load-bearing structural rod assembly 10 can be pulled out of the mounting hole to achieve quick-release.

When the quick-release connection device is in a locked state, due to the certain rigidity of the clamping piece 50, when connected with the main load-bearing structural rod assembly 10, the clamping piece 50 can axially limit the to-be-connected member 60 on the main load-bearing structural rod assembly 10 to avoid falling.

Figure 3:
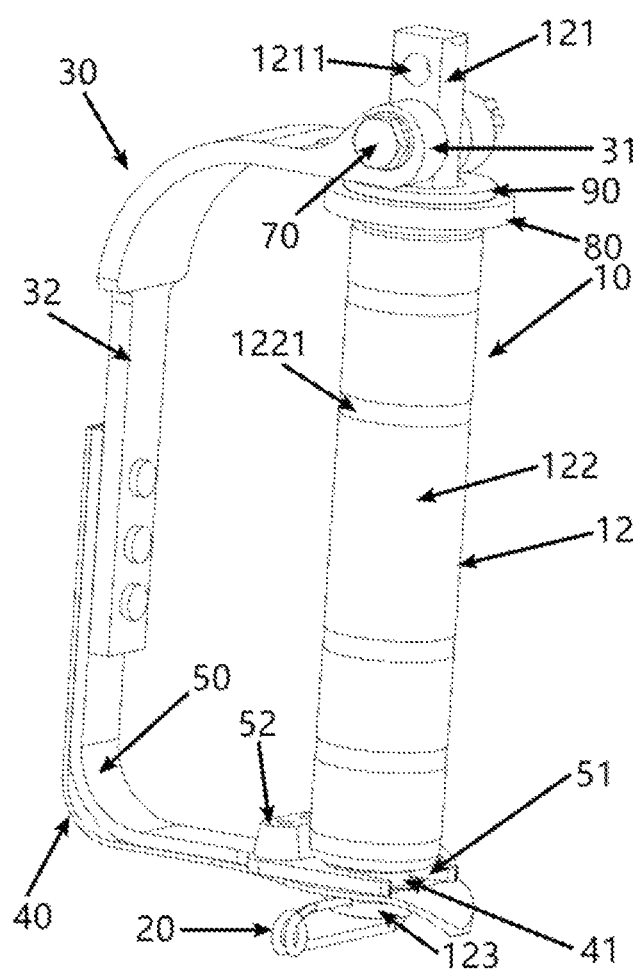
FIG. 3 structurally shows the quick-release connection device according to an embodiment of the present disclosure.
Figure 4:
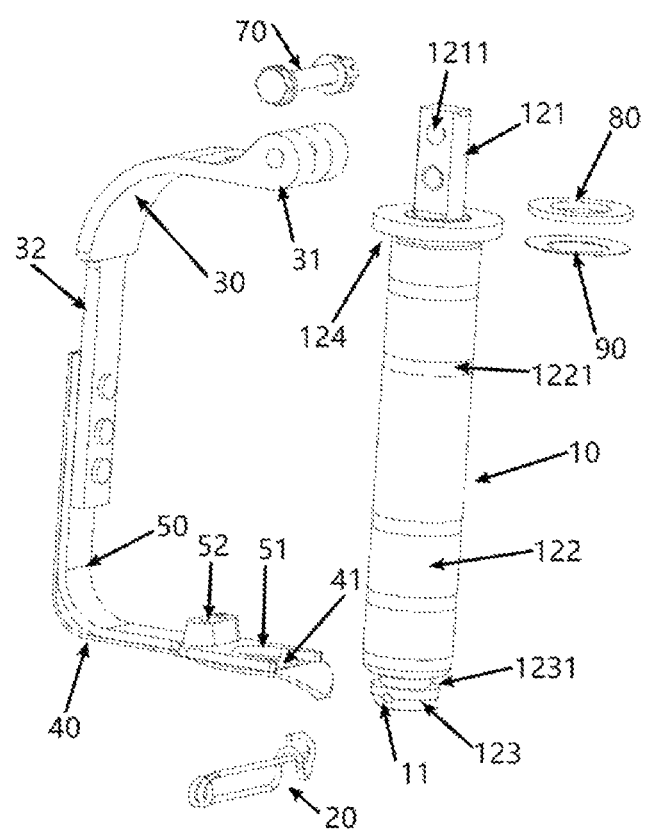
FIG. 4 is an exploded view of the quick-release connection device according to an embodiment of the present disclosure.

In addition, as shown in FIGS. 3 and 4, a stopping portion 52 is provided on the surface of the side of the clamping piece 50 away from the spring piece 40. The stopping portion 52 protrudes from the surface of the clamping piece 50, and is configured for axial limit. The stopping portion 52 can be integrally formed with the clamping piece 50, or be fixedly connected with the clamping piece 50. In this embodiment, the stopping portion 52 is riveted with the clamping piece 50. The stopping portion 52 is spaced from the opening 51. When the main load-bearing structural rod assembly 10 is inserted in the mounting hole of the to-be-connected member 60 and is locked via the safety pin 20, the stopping portion 52 can rest against the end face of the to-be-connected member 60, thereby preventing the quick-release connection device from falling out of the mounting hole under vibration and limiting the axial displacement of the quick-release connection device. Besides, the stopping portion 52 can be made of a nylon material, such that it can absorb vibration for damping.

Furthermore, the main load-bearing structural rod assembly 10 includes a core rod 12.

The core rod 12 has an integral shaft-shaped structure, and includes a connection portion 121, a shaft portion 122 and a boss portion 123, where the connection portion 121 and the boss portion 123 are located at the two opposite ends of the shaft portion 122, respectively. In this embodiment, the connection portion 121, the shaft portion 122 and the boss portion 123 are formed integrally.

The connection portion 121 is rotatably connected with the cam handle 30. Specifically, the connection portion 121 is provided with a pivot hole, which can be rotatably connected with the cam portion 31 of the cam handle 30 via the pivot 70. In this embodiment, the connection portion 121 has a rectangular cross section, and a limiting step 124 is formed between the connection portion 121 and the shaft portion 122 for limit.

The shaft portion 122 has a shaft-shaped structure, and is configured to be inserted in the mounting hole of the to-be-connected member 60. In this embodiment, the shaft portion 122 has a shape of round shaft. In addition, to prevent stress concentration, the outer wall of the shaft portion 122 is circumferentially provided with an unloading groove 1221. The number of the unloading groove 1221 can be one or more than one. The unloading groove 1221 can make it convenient for filling lubricant oil in the space between the mounting hole and the main load-bearing structural rod assembly 10.

The boss portion 123 is configured for sleeving of the spring piece 40 and the clamping piece 50. The radial dimension of the boss portion 123 is smaller than the radial dimension of the shaft portion 122, which allows the main load-bearing structural rod assembly 10 to be easily inserted into the mounting hole. The boss portion 123 is provided with the pin hole 11 for insertion of the safety pin 20. The boss portion 123 is provided with a ring-shaped clamping groove 1231, which is formed by the inward recessing of the outer wall of the boss portion 123. The spring piece 40 and the clamping piece 50 can be clamped in the clamping groove 1231 when the free ends thereof are sleeved on the boss portion 123, so as to further strengthen the axial limiting and the axial bearing capacity.

Furthermore, the core rod 12 can be further sleevedly provided with a Belleville spring 80. Specifically, the Belleville spring 80 is sleeved on the connection portion 121. The Belleville spring 80 is located between the cam handle 30 and the shaft portion 122, and is limited by the limiting step 124.

Furthermore, a gasket 90 can be further sleeved on the core rod 12. Specifically, the gasket 90 is sleeved on the connection portion 121, and is located between the Belleville spring 80 and the cam handle 30.

The Belleville spring 80 and the gasket 90 can ensure that when in the locked state, the cam handle 30 has a pretensioning force and will not vibrate under the exposure to vibration, so as to enhance the structure safety and stability.

Furthermore, an auxiliary hole 1211 is provided on the connection portion 121 of the main load-bearing structural rod assembly 10 for auxiliary unlocking. When the main load-bearing structural rod assembly 10 is clamped in the mounting hole and can not be easily pulled out, auxiliary tools can be used via the auxiliary hole 1211 to help release the main load-bearing structural rod assembly 10. The shape and the size of the auxiliary hole 1211 are not limited herein. It is a circular hole in this embodiment. The auxiliary hole 1211 is located at the proximal part of the connection portion 121 and the side of the cam portion 31 away from the limiting step 124.

Regarding the quick-release connection device provided herein, the cam handle 30 is rotatably connected to one end of the main load-bearing structural rod assembly 10, and can be rotated relative to the main load-bearing structural rod assembly 10; first ends of the spring piece 40 and the clamping piece 50 are fixedly connected together with the cam handle 30, and second ends thereof can be sleeved on the free end of the main load-bearing structural rod assembly 10; and the safety pin 20 is inserted into the free end of the main load-bearing structural rod assembly 10 to achieve the locking. In use, it is just required to rotate the cam handle 30 to achieve quick-release and quick-mount, simplifying the operation. The quick-release connection device provided herein is a thread-free structure, such that it can be mounted and dismounted repeatedly, and has a long service life. The combination of the spring piece and the clamping piece ensures the locking reliability and the structure rigidity. The quick-release connection device of this application has simple connection and reasonable transition between individual components and easy replacement, and can be machined and assembled using common devices or tools, suitable for the industrial manufacturing. The quick-release connection device of this application features simple structure, practical function, and convenient use, and has strong practicability, exhibiting a promising application prospect.

The above embodiments are merely illustrative of this application, and are not intended to limit the scope of this application. It should be understood that various replacements, modifications and changes made by those skilled in the art without departing from the spirit of this application shall fall within the scope of this application defined by the appended claims.

What is claimed is:

1. A quick-release connection device, comprising:
   a main load-bearing structural rod assembly;
   a safety pin;
   a cam handle;
   a spring piece; and
   a clamping piece;
   wherein the main load-bearing structural rod assembly has an elongated rod shape;
   and a free end of the main load-bearing structural rod assembly is provided with a pin hole;
   the safety pin is insertable into the pin hole;
   the cam handle is rotatably connected to an end of the main load-bearing structural rod assembly opposite to the free end;
   a first end of the spring piece is fixedly connected with the cam handle, and a second end of the spring piece is provided with an insertion hole, such that the spring piece is configured to be sleeved on the free end of the main load-bearing structural rod assembly, and to be limited by the safety pin to form a locking connection with the main load-bearing structural rod assembly; and
   a first end of the clamping piece is fixedly connected with the cam handle or the spring piece, and a second end of the clamping piece is provided with an opening communicated with outside such that the clamping piece is configured to be sleeved on the free end of the main load-bearing structural rod assembly, and to be limited by the spring piece to form a locking connection with the main load-bearing structural rod assembly.

2. The quick-release connection device of claim 1, wherein an end portion of the clamping piece is configured to extend in a length direction of the clamping piece to form the opening.

3. The quick-release connection device of claim 1, wherein the first end of the spring piece and the first end of the clamping piece are together fixedly connected with the cam handle; and the second end of the spring piece is configured to be separably attached to the second end of the clamping piece.

4. The quick-release connection device of claim 1, wherein the insertion hole is aligned with the opening; and the second end of the spring piece is configured to extend outside the second end of the clamping piece.

5. The quick-release connection device of claim 1, wherein a surface of a side of the clamping piece away from the spring piece is provided with a stopping member;
   and the stopping member is configured to protrude from the surface of the side of the clamping piece away from the spring piece.

6. The quick-release connection device of claim 5, wherein the stopping member is spaced from the opening.

7. The quick-release connection device of claim 1, wherein the clamping piece has a rigid structure.

8. The quick-release connection device of claim 1, wherein the main load-bearing structural rod assembly comprises a core rod; the core rod comprises a connection portion, a shaft portion and a boss portion; the connection portion and the boss portion are respectively located at two opposite ends of the shaft portion; the connection portion is provided with a pivot hole to be rotatably connected with the cam handle; a limiting step is formed between the connection portion and the shaft portion; and the boss portion is provided with the pin hole.

9. The quick-release connection device of claim 8, wherein the connection portion is sleevedly provided with a Belleville spring; and the Belleville spring is located between the cam handle and the shaft portion.

10. The quick-release connection device of claim 9, wherein the core rod is provided with a gasket; and the gasket is located between the Belleville spring and the cam handle.

11. The quick-release connection device of claim 8, wherein the connection portion is provided with an auxiliary hole; and the auxiliary hole is located on a side of the cam handle away from the limiting step.

* * * * *